Patented June 28, 1949

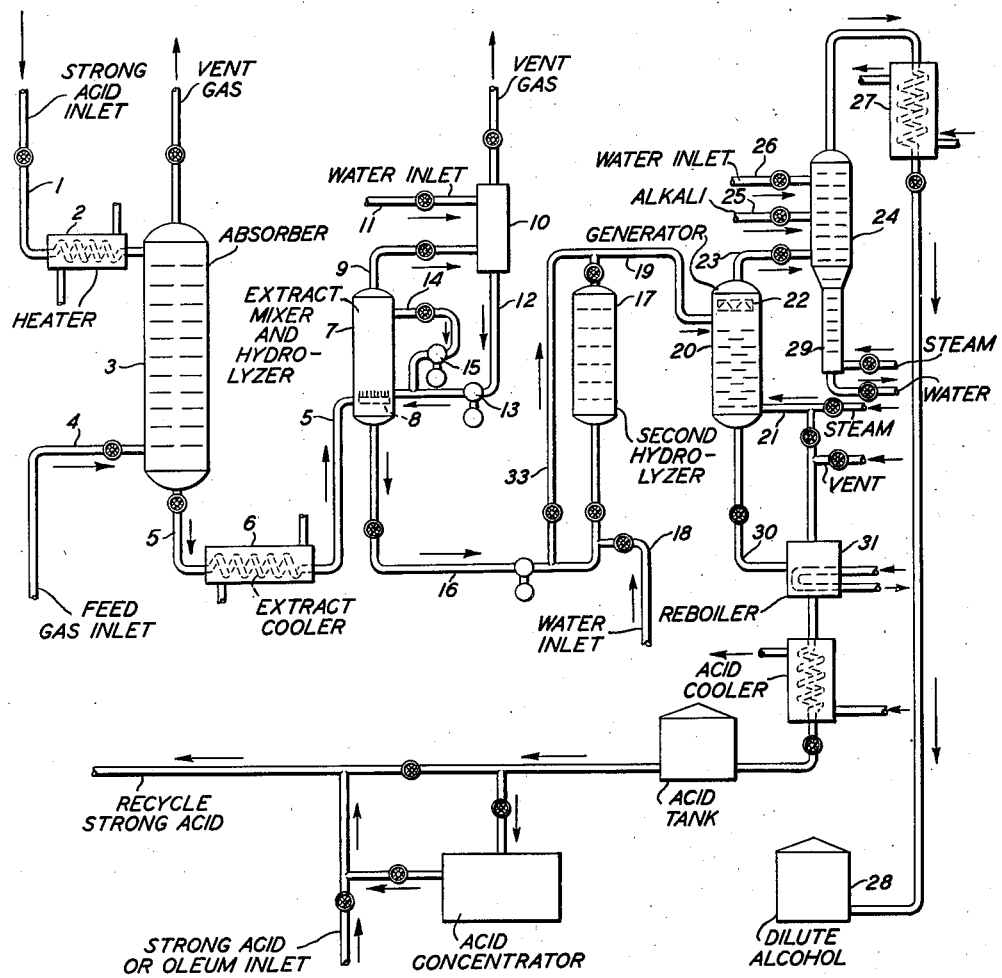

2,474,569

UNITED STATES PATENT OFFICE 2,474,569

DILUTION AND HYDROLYSIS OF DIETHYL SULFATE SOLUTIONS

Lewis A. Bannon, Baton Rouge, La., assignor to Standard Oil Development Company, a corporation of Delaware Application June 11, 1946, Serial No. 676,079

8 Claims. (Cl. 260—639)

This invention relates to the production of alcohols by hydrolysis of sulfuric acid extracts of normally gaseous olefins, and is particularly applicable to the preparation of pure ethyl alcohol.

When olefins such as ethylene are absorbed in strong sulfuric acid, the resulting solution contains ethyl hydrogen sulfate, sulfuric acid, and also diethyl sulfate and ethyl alcohol. The composition approaches equilibrium which varies with the acid strength. Under the conditions normally used for absorbing ethylene in strong sulfuric acid of about 90 to 100 weight percent concentration, the resulting solution will contain a substantial proportion of diethyl sulfate. This compound (B. P. 208° C.) is volatile with steam, hence is carried overhead in steam stripping of alcohol from the partially hydrolyzed extract. It is an objectionable impurity in the resulting alcohol, as it liberates sulfuric acid by hydrolysis, causing corrosion and imparting a bad odor to the alcohol. Hence, it is desirable to remove diethyl sulfate as completely as possible from the acid extract before distilling off the alcohol. This is normally attempted by hydrolysis, but such continuous operations as have heretofore been described either involve incomplete hydrolysis of the diethyl sulfate, or else involve excessive formation of diethyl ether. For example, when the hydrolysis is conducted by passing water and acid extract continuously into a hydrolyzer with mixing, and withdrawing to a steam stripper a continuous stream of the hydrolyzed material, the latter will always contain some diethyl sulfate, even though a very long residence time is permitted in the hydrolyzer. If the mixer is operated batchwise, and a sufficiently long time is permitted to hydrolyze the diethyl sulfate completely, very large equipment is required. In both operations the formation of ether is excessive, as the following reactions occur:

(1) $(C_2H_5)_2SO_4 + C_2H_5OH =$
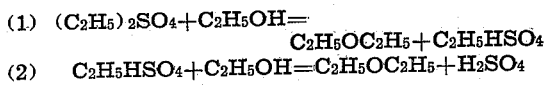
$C_2H_5OC_2H_5 + C_2H_5HSO_4$ (2) $C_2H_5HSO_4 + C_2H_5OH = C_2H_5OC_2H_5 + H_2SO_4$ Hence, it has been found desirable to limit the time during hydrolysis in which substantial concentrations of diethyl sulfate and ethyl alcohol are permitted to be in contact with each other, in order to avoid reaction 1.

The desired reactions in hydrolysis of the extract are:

(3) $(C_2H_5)_2SO_4 + H_2O = C_2H_5OH + C_2H_5HSO_4$
(4) $C_2H_5HSO_4 + H_2O = C_2H_5OH + H_2SO_4$

Reactions 3 and 1 have been found to be much more rapid than 2 or 4 in 40–55% acid at temperatures below about 90° C. In the two-stage hydrolysis of the diethyl sulfate according to this invention, it is accordingly possible to carry reaction 3 to virtual completion before 4 can contribute large concentrations of alcohol for reaction 1. In this manner, formation of ether from the diethyl sulfate is greatly suppressed.

Also, reaction 2 greatly limits the time permitted for the hydrolysis of the ethyl sulfate and for this reason it has been proposed that this reaction be carried out by feeding the extract to a tower countercurrent to stripping steam, which removes the alcohol as fast as it is formed. However, as indicated above, such extract fed to the tower must be substantially free of diethyl sulfate in order to keep this volatile compound out of the alcohol distillate.

Diethyl sulfate, although soluble in concentrated sulfuric acid, has very limited solubility in dilute acid of 40 to 55% strength and is precipitated from solution in the strong acid extract on dilution with water when this is carried out in the ordinary manner. This separate diethyl sulfate phase is quite difficult to hydrolyze and, if it is permitted to form, very intensive stirring of the hydrolyzer is required in order to obtain this phase in a state of sufficiently fine dispersion for it to be hydrolyzed by the diluted acid in a reasonable period of time. Even then, the operation of the hydrolyzer is much more difficult and expensive than when the formation of this separate phase is prevented.

It has now been found that precipitation of the diethyl sulfate phase on hydrolysis can be prevented by suitable regulation of the method of dilution and of the extent of the hydrolysis. It has been found that the diethyl sulfate present in strong sulfuric acid extract is appreciably soluble in the diluted extract when this extract has undergone partial hydrolysis. The resulting alcohol formed on hydrolysis of some of the diethyl sulfate increases the solubility of diethyl sulfate in the extract. However, the extent of this hydrolysis must be carefully limited in order to avoid increasing the alcohol concentration to a point at which the above described undesirable ether forming reactions become significant. It has been found that a suitable solvent for the diethyl sulfate is obtained by subjecting the original extract to a limited hydrolysis in which substantially only the diethyl sulfate is hydrolyzed. This may be accomplished by passing separate streams of the strong extract, containing diethyl sulfate, and water into a hydrolysis zone while
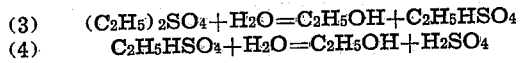

continually maintaining thorough mixing therein to provide a substantially uniform composition throughout the zone, and while providing a sufficient residence time in the zone to hydrolyze the major portion of the added diethyl sulfate. In starting up such an operation special precautions must be taken to add water very slowly and to provide sufficient hydrolysis time to hydrolyze the diethyl sulfate in the initial charge of extract to the hydrolyzer. Thereafter the operation may be conducted on a continuous basis in the manner described above.

This invention will be further described with reference to the accompanying drawing which is a diagrammatic illustration in partial sectional elevation of one suitable type of equipment for carrying out the process of this invention, and indicates the flow of materials. Suitable conditions for the various absorption, hydrolysis and distillation operations are also given in the following detailed description, which is presented for purpose of illustration and not in limitation of this invention.

Referring to the drawing, strong sulfuric acid of about 90–100% concentration, preferably 96–100%, is passed by line 1 through heater 2 into the upper portion of an absorption tower 3 at a temperature of about 40 to 50° C. A feed gas containing ethylene such as a $C_2$ fraction of gas obtained by cracking gas oil at temperatures of about 650 to 760° C. in the presence of steam and containing 25 to 50% ethylene, is passed by line 4 into the lower portion of the tower 3 at a pressure of about 400 to 500 pounds per square inch. The tower contains suitable bubble trays or other packing for providing intimate liquid-gas contact and is also provided with suitable heat exchangers (not shown) distributed throughout the tower to remove the heat of reaction and to maintain the temperature in the tower at about 70 to 85 or 90° C.

Under such conditions more than 90% of the ethylene is dissolved in the resulting acid extract which contains about 1.0 to 2.0, preferably 1.3 to 1.4 mols of ethylene per mol of sulfuric acid, of which about ⅔ is in the form of diethyl sulfate. This extract is removed from the absorber by line 5 and is passed through cooler 6 and then, at a temperature of about 45° C., into an extract mixer and first hydrolysis stage 7, suitably by a number of jets 8 arranged on the extract feed pipe in order to provide thorough mixing in this hydrolyzer, which is maintained at a pressure of about 50 pounds per square inch gauge and at a temperature of about 80 to 110° C., and preferably at 80 to 85 or 90° C. when it is desired to limit the formation of ether.

The physically dissolved gases which are released from the extract in this mixer due to the reduction in pressure are vented from the upper portion of the vessel 7 through line 9 and are washed in the vent gas scrubber 10 with water supplied by line 11, this water then being passed by line 12 and pump 13 into the vessel 7 in order to dilute the extract therein. Sufficient water is supplied to maintain a sulfuric acid concentration in this first hydrolyzer of about 40 to 55 weight percent (hydrocarbon-free basis). That is, the weight percent of sulfuric acid is calculated on the basis of the total equivalent weights of sulfuric acid and water present in free and combined form, the hydrocarbon content of the extract being excluded from this calculation. It is desirable to obtain rapid and uniform mixing of the extract with the dilution water in the vessel 7; this may be aided by recycling extract by means of line 14 and pump 15 or by stirrers suitably disposed in the vessel 7. The recycled extract may be mixed with fresh extract in line 5 or with dilution water in line 12. This mixing involves far less consumption of power than that required when a separate oily diethyl sulfate phase is permitted to form. A sufficient residence time is allowed in the vessel 7 for the hydrolysis of the major portion of the entering diethyl sulfate. The resulting diluted and partly hydrolyzed extract existing in this vessel then has sufficient solubility for the entering diethyl sulfate that its precipitation as a separate phase is avoided. This expedites the hydrolysis reaction and reduces the mixing problem. A residence time in this zone of about 10 to 20 minutes, preferably about 14 to 17 minutes, with temperatures maintained at 80 to 90° C. (the time being inversely related to the temperature) will be found sufficient to accomplish the desired hydrolysis of the diethyl sulfate. This will vary somewhat with the concentration of the extract.

The resulting partly hydrolyzed extract, which still contains about 4 to 6% of its sulfate components in the form of diethyl sulfate, is withdrawn by line 16 and is passed through a second hydrolysis zone 17 which may suitably be in the form of a long narrow cylinder or tower containing suitably disposed baffles to prevent internal recirculation and mixing of the streams entering and leaving this vessel. The second hydrolysis zone may also be in the form of a long pipe or pipe coil suitably designed to accomplish the same purpose of preventing internal mixing or turbulence over more than a limited portion of its length. Additional water to further dilute the extract to a sulfuric acid concentration of about 40 to 45 weight percent (hydrocarbon-free basis) may be added by line 18. This second hydrolysis zone 17 is preferably maintained at a temperature between about 80 and 90 or 95° C. with sufficient residence time for the extract therein to permit substantially complete hydrolysis of the entering diethyl sulfate. This time is suitably about 20 to 30 minutes, depending upon the temperature of the vessel 17 and the diethyl sulfate content of the extract supplied thereto.

The resulting extract, substantially free of diethyl sulfate and containing ethyl hydrogen sulfate and ethyl alcohol, is passed by line 19 to a suitable alcohol generator 20 in which the extract is stripped with steam or other suitable gases for distilling off the ethyl alcohol. In order to reduce ether formation, it is desirable to remove the alcohol from the extract as rapidly as possible, as by stripping the extract in a tower countercurrent to steam.

In cases where the formation of ether is not a serious objection, as when there is a reasonable market for by-product ether, the hydrolysis of the diethyl sulfate may be substantially completed in the first hydrolysis zone by the use of a longer residence time and/or a higher temperature and the second hydrolysis may be bypassed by line 33. Under such conditions times as short as about five minutes may be used at hydrolysis temperatures up to about 110° C.

The tower 20 contains suitable packing or distributing plates for providing intimate liquid-gas contact between the down-flowing extract and steam which is supplied to the lower portion of the tower by line 21. The steam-alcohol vapor mixture leaves the top of the tower through a dephlegmator 22 and then is passed by line 23 into a scrubbing tower 24 in which it is scrubbed first with aqueous alkali supplied by line 25 and then with water supplied by line 26. The vapors leaving tower 24 are condensed in cooler 27 and the resulting dilute alcohol condensate is received in drum 28 from which it may be concentrated by any suitable method. This aqueous alcohol will be found to be free of diethyl sulfate and of mineral acid and to contain very small amounts of ether. It can be readily concentrated to provide alcohol of extremely high purity and good odor. Loss of alcohol in the scrubbing water in tower 24 is prevented by supplying stripping steam to a lower stripping section 29 of this tower.

The stripped and diluted sulfuric acid leaves the bottom of generator 20 by line 30 and may be concentrated and, if desirable, recycled to the absorber by any suitable method. For example, it may be passed into a reboiler 31 in which it is heated by "Dowtherm" or other indirect means to a temperature sufficient to concentrate it to about 65 to 70 weight percent sulfuric acid. This acid may then be further concentrated in a vacuum concentrator and may be recycled to the absorber, with or without such concentration, and with suitable fortification with fresh concentrated acid or oleum.

As an example of the effectiveness of this invention, a pilot plant having a capacity of 264 gallons finished ethyl alcohol (95%) per day was operated on a continuous basis with fresh acid extract and dilution water mixed thoroughly in a small mixing chamber in line 5 before entering the hydrolyzer 7. In spite of agitation in this hydrolyzer, a diethyl sulfate phase separated in its upper portion and gradually filled it, causing coke formation and loss of hydrolysis time. When the dilution water was changed to a separate stream entering the hydrolyzer 7, no such phase separation or coking occurred during continuous operation.

I claim:
1. An improved continuous process for the hydrolysis of a solution of diethyl sulfate in strong sulfuric acid which, on dilution with water, will form a separate diethyl sulfate phase, comprising passing a stream of said solution into a hydrolysis zone containing partly hydrolyzed solution having sufficient ethyl alcohol to prevent formation of a separate phase of the added diethyl sulfate, separately adding water to said zone to maintain therein 40–55 weight per cent (hydrocarbon-free basis) sulfuric acid, maintaining said zone at a suitable hydrolysis temperature with mixing to provide a substantially uniform composition throughout said zone, providing sufficient residence time in said zone to hydrolyze at least the major portion of said added diethyl sulfate, withdrawing a stream of the hydrolyzed solution from said zone and separating ethyl alcohol therefrom.

2. An improved process for the preparation of ethyl alcohol from a solution of diethyl sulfate in strong sulfuric acid which, on dilution with water, will form a separate diethyl sulfate phase, comprising passing a stream of said solution into a hydrolysis zone containing hydrolyzed solution having sufficient ethyl alcohol to prevent formation of a separate phase of the added diethyl sulfate, separately adding water to said zone to maintain therein 40–55 weight percent (hydrocarbon-free basis) sulfuric acid, maintaining said zone at a temperature of 80 to 110° C. with mixing to provide a substantially uniform composition throughout said zone, providing a residence time in said zone sufficient to hydrolyze at least the major portion of said added diethyl sulfate, withdrawing a stream of the resulting solution from said zone, completing the hydrolysis of ethyl sulfate remaining in said solution and stripping alcohol from the solution by contact with steam.

3. Process according to claim 2, in which the temperature in said hydrolysis zone is maintained at 80 to 90° C. and the time of residence in said zone is about 10 to 20 minutes.

4. Process according to claim 2, in which the said hydrolysis zone temperature is 80 to 90° C., the sulfuric acid concentration of the diluted solution therein is about 45 weight percent (hydrocarbon-free basis), and the time of residence in said zone is about 14 to 17 minutes.

5. Process according to claim 2, in which the said strong sulfuric acid solution contains from 1 to 2 mols of ethyl radicals per mol of total sulfate radicals present as sulfuric acid and ethyl sulfates.

6. An improved continuous process for the hydrolysis of a solution of diethyl sulfate in strong sulfuric acid which, on dilution with water, will form a separate diethyl sulfate phase, comprising passing a stream of said solution into a hydrolysis zone containing sufficient aqueous ethyl alcohol to prevent formation of a separate diethyl sulfate phase, separately adding water to said hydrolysis zone to maintain therein 40–55 weight percent (hydrocarbon-free basis) sulfuric acid, maintaining said zone at a suitable hydrolysis temperature with mixing to provide a substantially uniform composition throughout said zone providing sufficient residence time in said zone to hydrolyze at least the major portion of the diethyl sulfate, withdrawing a stream of the hydrolyzed solution from said zone and separating ethyl alcohol therefrom.

7. An improved continuous process for the hydrolysis of a solution of diethyl sulfate in strong sulfuric acid which, on dilution with water, will form a separate diethyl sulfate phase, comprising passing a stream of said solution into a hydrolysis zone, passing a stream of aqueous ethyl alcohol into said zone in amount sufficient to prevent formation of a separate diethyl sulfate phase, separately adding water to said hydrolysis zone to maintain therein 40–55 weight percent (hydrocarbon-free basis) sulfuric acid, maintaining said zone at a suitable hydrolysis temperature with mixing to provide a substantially uniform composition throughout said zone providing sufficient residence time in said zone to hydrolyze at least the major portion of the diethyl sulfate, withdrawing a stream of the hydrolyzed solution from said zone and separating ethyl alcohol therefrom.

8. An improved continuous process for the hydrolysis of a solution of diethyl sulfate in strong sulfuric acid which, on dilution with water, will form a separate diethyl sulfate phase, comprising passing a stream of said solution into a hydrolysis zone, passing into the hydrolysis zone a stream of partially hydrolyzed diethyl sulfate containing sufficient ethyl alcohol to prevent formation of the separate diethyl sulfate phase, separately adding water to said hydrolysis zone to maintain therein 40–55 weight percent (hydrocarbon-free basis) sulfuric acid, maintaining said zone at a suitable hydrolysis temperature with mixing to provide a substantially uniform composition throughout said zone providing sufficient residence time in said zone to hydrolyze at least the major portion of the diethyl sulfate, withdrawing a stream of the hydrolyzed solution from said zone and separating ethyl alcohol therefrom.

LEWIS A. BANNON.

REFERENCES CITED

The following references are of record in the file of this patent:

UNITED STATES PATENTS

| Number | Name | Date |
|---|---|---|
| 2,013,453 | Stuart | Sept. 3, 1935 |
| 2,045,616 | Sargent | June 30, 1936 |
| 2,096,878 | Brooks | Oct. 26, 1937 |
| 2,414,759 | Mottern | Jan. 21, 1947 |